V. GAUVREAU.
HOLDING DEVICE.
APPLICATION FILED AUG. 31, 1915.
1,174,138.
Patented Mar. 7, 1916.
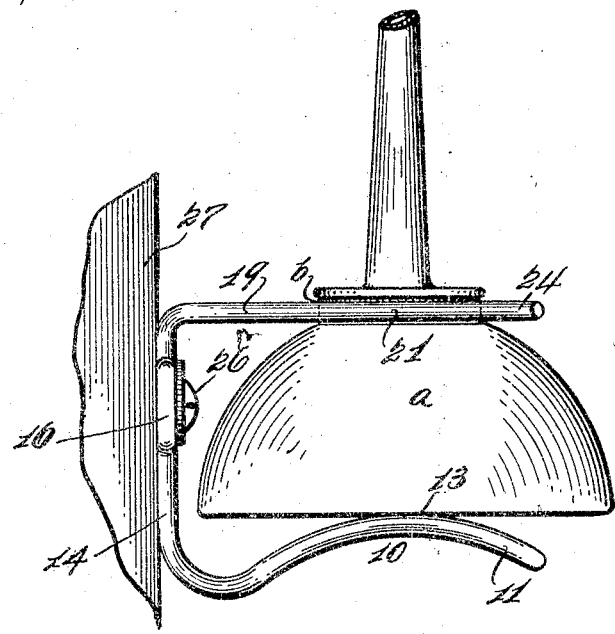
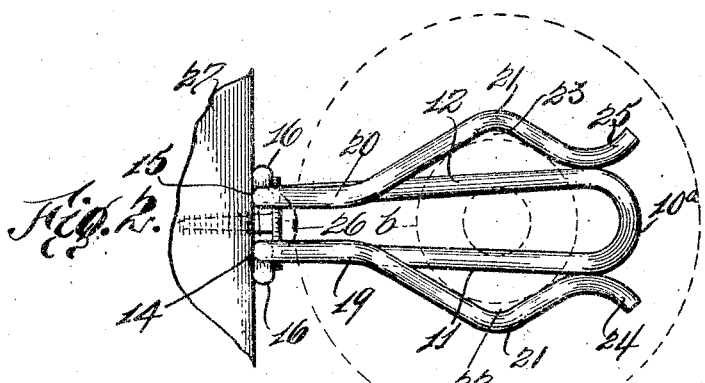
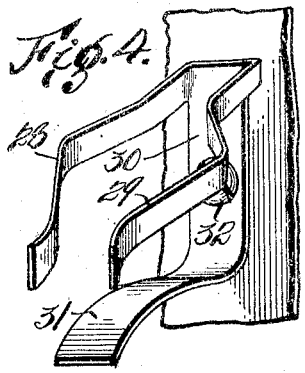
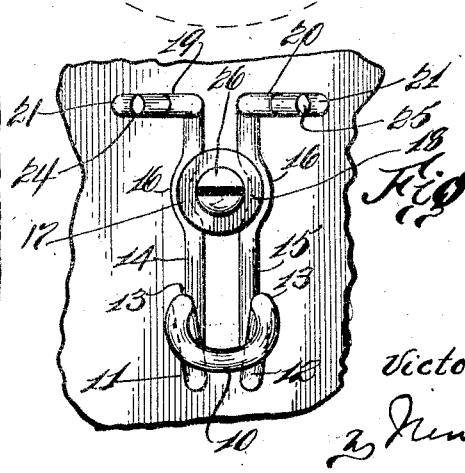
Witnesses
Inventor
Victor Gauvreau.
attorneys

UNITED STATES PATENT OFFICE.

VICTOR GAUVREAU, OF DETROIT, MICHIGAN, ASSIGNOR TO DODGE BROTHERS, OF DETROIT, MICHIGAN, A CORPORATION OF MICHIGAN.

HOLDING DEVICE.

1,174,138. Specification of Letters Patent. Patented Mar. 7, 1916.

Application filed August 31, 1915. Serial No. 48,214.

*To all whom it may concern:*

Be it known that I, VICTOR GAUVREAU, a citizen of the United States, residing at Detroit, Michigan, have invented certain new and useful Improvements in Holding Devices, of which the following is a clear, full, and exact description.

This invention relates to holding devices especially adapted for use as an oil-can bracket, for supporting an oil-can in position for instance on the front part of the dash, under the hood and behind the motor of an automobile.

Among the objects of the invention are the provision of an oil-can bracket which is simple, inexpensive, inconspicuous, subject to little wear and will not get out of order.

These being among the objects of the present invention the same consists of certain features of construction and combinations of parts to be hereinafter described and then claimed with reference to the accompanying drawings illustrating suitable embodiments of the invention and in which—

Figure 1 is a side elevation of the device shown in position on a dash-board and supporting an oil-can; Fig. 2 is a plan of the same parts, the oil-can being shown in dotted lines; Fig. 3 is a front elevation of the same parts, the oil-can being omitted; and Fig. 4 is a perspective view of a modification of the device.

Referring to Figs. 1, 2 and 3 which illustrate the preferred embodiment of the invention, it will be seen that the holding device is composed of spring wire bent into suitable shape to provide coöperating parts. In detail the device comprises a loop or U-shaped pressure-member 10 which is bent up from the intermediate portion of the wire, so as to provide side portions 11, 12, which are substantially parallel with each other, although as shown they slightly converge away from the bend 10ª of the wire, said sides being both arched or humped upwardly as indicated at 13. The device also comprises shank members 14, 15 which are bent upwardly from the side portions 11, 12 of the pressure-member, and said shank members extend in substantial parallelism, being bent intermediately of their lengths at 16. The bends 16 in said shank members are directed away from each other so as to provide opposing recesses 17, 18. Furthermore the device comprises a pair of gripping jaws 19, 20 bent at an angle to said shank members 14, 15, so as to extend over said pressure-member. Said gripping jaws are bent intermediate of their lengths at 21, the bends being disposed in opposite directions so as to provide opposing recesses 22, 23, and the ends 24, 25 of said jaws diverge outwardly from each other.

It will be seen therefore that the improved holding device comprises a shank such as 14, 15, a pressure-member such as 10, and gripping jaws such as 19, 20, said jaws and the said pressure-member extending in the same general direction with said pressure-member located underneath said jaws.

The device being composed of springy material it will be seen that if the jaws are pressed apart they tend to spring together and that the pressure-member acts in a direction at right-angles to the plane of action of the gripping jaws.

The device may be used to support an oil-can such as *a*, which is provided with a neck such as *b*, the recesses 17, 18 of the shank members providing an opening for receiving a fastening screw or bolt 26 whereby the device may be secured to a dash 27.

It will be obvious that when the parts of the device are proportioned properly with respect to the proportions of an oil-can to be supported, the can may be engaged with the device by pressing the body thereof between the pressure-member 10 and the jaws 19, 20, and the neck *b* of the can between said jaws, so that the recesses 22, 23 will receive said neck *b*, the ends 24, 25 of said jaws snapping behind said neck, while the pressure-member 10 will engage with the bottom of the oil-can and hold the can up toward the jaws. The combined spring actions of the pressure-member and the gripping jaws hold the can securely and without rattling and at the same time do not exert as great a tendency as a more rigid construction would to work loose from its fastening on the dash.

The device is of course made in different sizes for supporting different sizes of cans.

A modification of the invention is illustrated in Fig. 4, in which the device is shown as composed of spring sheet metal, and comprises opposing gripping jaws 28, 29, a shank 30 from which said jaws extend outwardly, and a pressure-member 31 also extending outwardly, the parts being so constructed and arranged as to act similarly to the device bent up from wire. A fastening screw or bolt 32 extends through an opening in shank 30 for supporting the device upon a dash.

Obviously the invention is susceptible of other changes in detail, as parts may be omitted, added and substituted without departing from the spirit and scope of the invention.

What I claim as new is:—

1. A holding device, composed of spring wire, bent up into the following parts: a pair of gripping jaws having opposing recesses and outwardly diverging ends beyond said recesses, a pressure member having a portion humped up toward said recesses, said member being located to one side of the common plane of said jaws and adapted to exert its pressure at an angle to said plane, and shank members connecting said pressure member with said jaws and provided with opposing recesses forming an opening for a fastening.

2. A holding device, composed of spring wire and comprising a pressure-member bent into substantial loop or U-shape at the approximate midlength of said wire, the sides of said member being both arched or humped upwardly, shank members bent upwardly from said sides and extending in substantial parallelism, said shank members being bent intermediately at opposite points to provide an opening for a fastening, and a pair of gripping jaws bent at an angle to said shank members and extending over said pressure-member, said jaws being bent intermediately at opposite points to provide opposing recesses and the outer ends of said jaws at the extremities of said wire being bent away from each other.

Signed at Detroit, Mich., this 25th day of August, 1915.

VICTOR GAUVREAU.

Witnesses:
R. A. DE VLIEG,
A. H. KNIGHT.